United States Patent [19]
Yamano

[11] 3,909,020
[45] Sept. 30, 1975

[54] APPARATUS FOR AUTOMATICALLY CONTROLLING THE SIZE OF THE OPENING OF THE JAWS OF A CHUCK

[75] Inventor: Kenji Yamano, Kawasaki, Japan

[73] Assignee: Fuji Electric Co., Ltd., Kawasaki, Japan

[22] Filed: Aug. 7, 1974

[21] Appl. No.: 495,466

[30] Foreign Application Priority Data
Aug. 8, 1973 Japan................................. 48-93330

[52] U.S. Cl. ................ 279/1 H; 279/110; 318/467; 82/34 R
[51] Int. Cl............................................ B23b 31/28
[58] Field of Search.................... 279/1 H, 1 R, 110; 318/467, 466, 638, 475

[56] References Cited
UNITED STATES PATENTS

| | | | |
|---|---|---|---|
| 1,848,317 | 3/1932 | Church................................. | 279/1 H |
| 2,913,648 | 11/1959 | Brouwer........................ | 318/630 X |

*Primary Examiner*—Gil Weidenfeld
*Attorney, Agent, or Firm*—Sughrue, Rothwell, Mion, Zinn & Macpeak

[57] ABSTRACT

The detection of the degree of opening or closing of an electrically driven chuck on a machine tool or the like has a first shaft rotated synchronously with the main shaft of the machine tool, an externally threaded shaft parallel thereto rotated synchronously with the chuck drive motor shaft controlling the opening and closing of the chuck jaws. The casing for the externally threaded shaft is provided with a limit switch dog and rotatively supports a first bushing capable of rotating concurrently with said first shaft and a second bushing having an internal thread which engages the external threaded shaft and supported movably relative to the shaft axis with at least one limit switch positioned in the path of movement of the limit switch dog for providing a signal representing the degree of opening of the jaws as a result of contact by the axially movable limit switch dog.

3 Claims, 2 Drawing Figures

U.S. Patent  Sept. 30, 1975  3,909,020
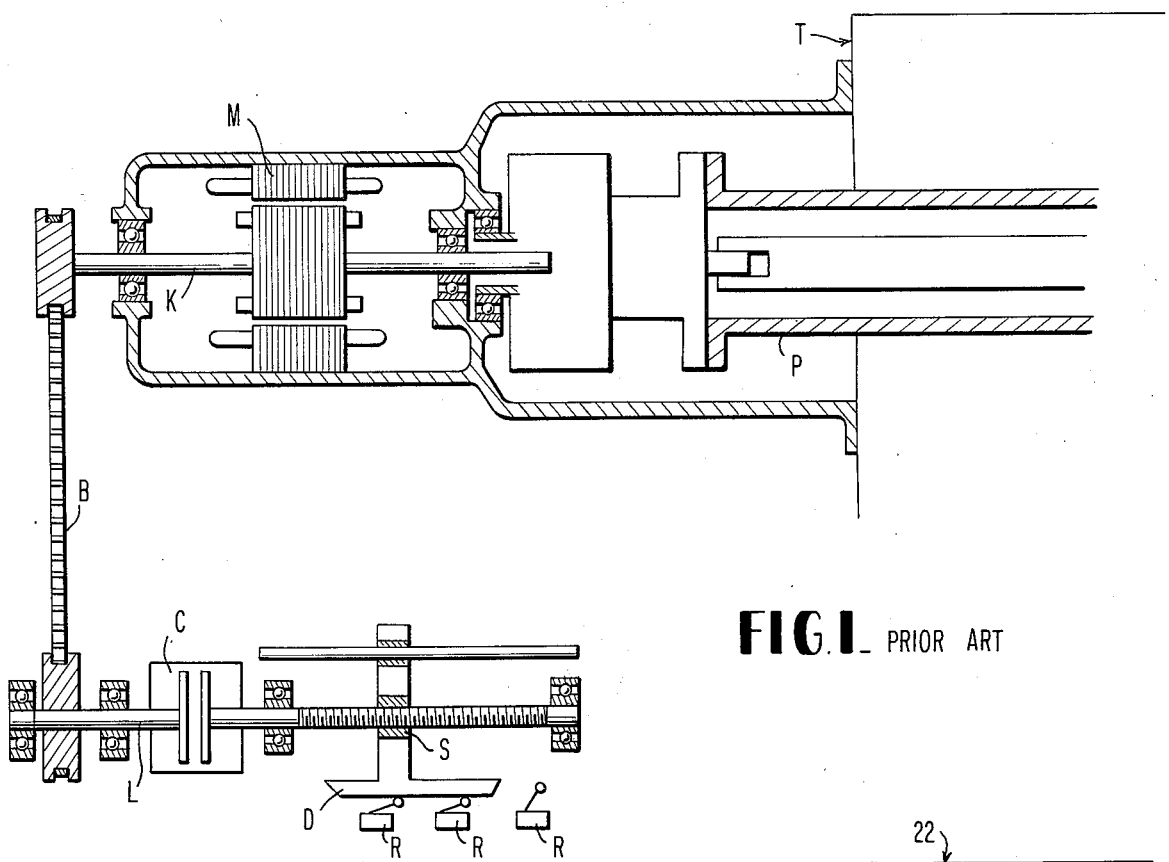
FIG. 1 _ PRIOR ART
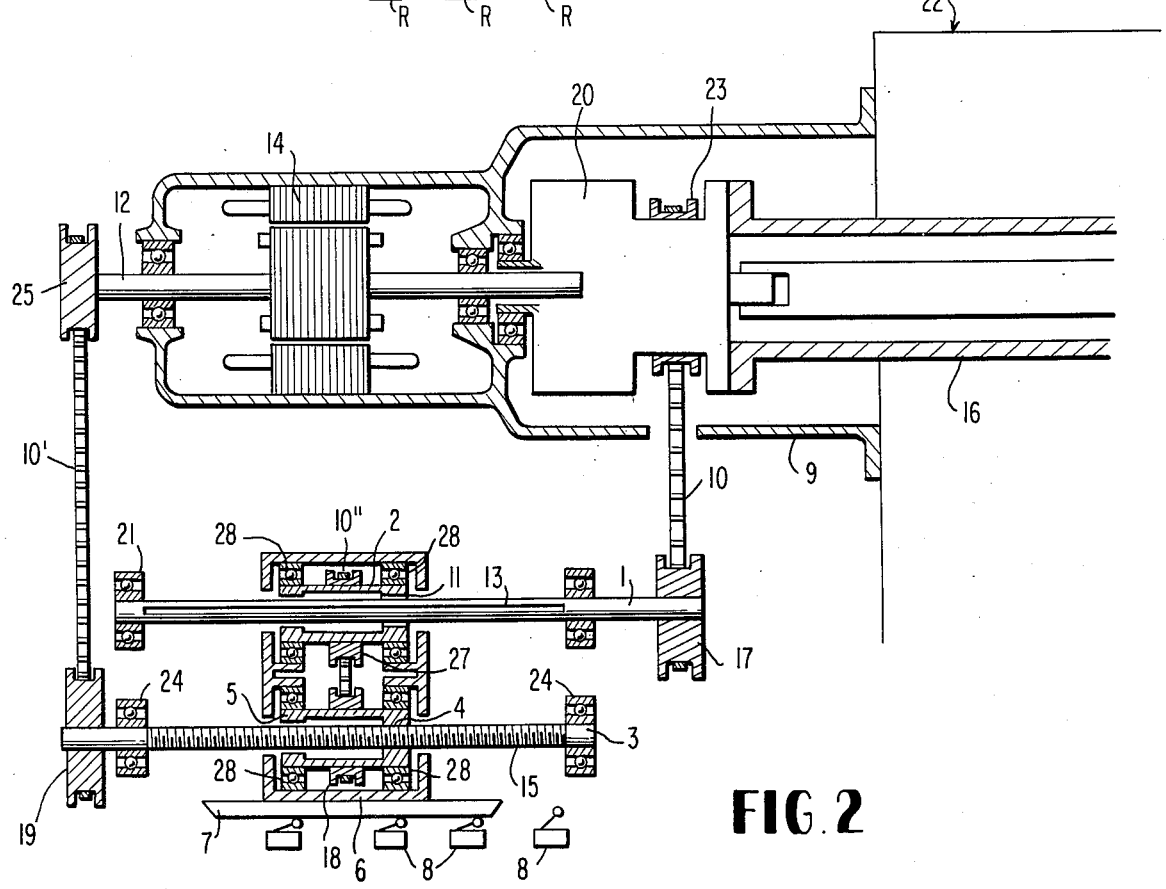
FIG. 2

APPARATUS FOR AUTOMATICALLY CONTROLLING THE SIZE OF THE OPENING OF THE JAWS OF A CHUCK

BACKGROUND OF THE INVENTION

1. Field of the Invention

The present invention relates to numerical count controlled machine tools, and more particularly to means for detecting the opening degree of the jaws of an electrically driven chuck on such a numerical count controlled machine tool.

2. Description of the Prior Art

In recent years, remarkable progress has been made in the automation of machine tools, especially in the field of numerical count controlled machine tools which are controlled in accordance with tape programming or the like.

Such progress has given rise to the adaptation of numerical count controlled machine tools for the production of different shaped and different sized articles with each article being relatively few in number.

Under these circumstances, the present invention provides means for detecting the degree of opening of the jaws of an electrically driven chuck which can be advantageously used in combination with the electrically driven chuck set forth in U.S. patent application Ser. No. 212,917 filed on Dec. 27, 1971 now abandoned and entitled "Electric Motor Drive Chuck Device."

It is an object of the present invention to provide an electrically driven chuck which is capable of being incorporated within a control system in such a manner that the desired opening degree of the chuck jaws is preset numerically in accordance with the diameter of the work piece to be held by the chuck, and then a signal is delivered to the driving unit for opening or closing of the chuck jaws, while another signal is transmitted from the detector which represents the actual chuck opening degree for comparison with the preset value in the control system, so that the drive signal to the chuck driving unit is stopped when the desired opening of the chuck jaws is detected by the detector.

The present invention is based on the advantageous feature wherein the chuck of the above referred patent application involves the relationship wherein there exists a constant value for the ratio between the distance traveled by the jaws and the difference between the number of revolutions of the chuck driving motor shaft and the number of revolutions of a main power shaft for the machine tool. It is to be understood that the position of the chuck jaws can be detected, that is, the opening between the jaws, by counting the revolutions of these shafts and making a comparison thereof.

Because of these features, in the chuck of the referred to patent application, the present invention provides good reproducability in terms of chuck jaw position which is essential for the automatic control of the machine tool, and at the same time enables the chuck to be interlocked, that is, to cooperate with associated automatically operated parts by further utilization of the signal representing the actual opening degree of the jaws.

In an automatic machine tool, the jaws of the chuck are controlled in such a manner that their opening degree is adjusted so as to meet the diameter of the workpiece to be grasped, prior to grasping of the workpiece.

There have been two ways for effecting the above control of the chuck. One of them utilizes timer means and the other employs what is called "the mechanical screw method." By reference to FIG. 1, the prior art "mechanical screw method" is employed in a machine tool T in which a clutch C is employed in conjunction with a feed screw S in such a manner that when the main shaft P of the machine tool T stops, the clutch C connects the feed screw S to a chuck driving motor M through sprockets on the chuck driving motor shaft K and the chuck shaft F, which are coupled by way of a timing belt B. The driving motor M then drives the feed screw S upon receipt of a signal for opening or closing of the chuck jaws (not shown), whereby a limit switch dog D which is operatively arranged to engage the screw S is moved in the longitudinal direction of the screw S. Thus, the opening and closing of the chuck jaws results from the rotation of the chuck driving motor shaft K.

There are a plurality of limits which are disposed along the feed screw S, so as to be depressed by the moving dog D in sequence. Since the distance traveled by the dog D is related to the distance traveled by the jaws of the chuck, signals representing the opening degree of the jaws are available from the limit switches R and delivered to the control system (not shown) which causes the motor to stop when the desired chuck jaw opening degree is obtained.

Although this mechanical screw method provides a simple way for detecting the opening degree of the jaws, there is a shortcoming inherent in this method.

Namely, it is strictly required that the clutch C be engaged after the main shaft P comes to a full stop. If the clutch were engaged at the moment when the main shaft P is still rotating, the limit switch would begin its travel irrespective of the opening degree of the jaws of the chuck which would necessarily cause an error in the detection of that opening degree. This error, once it is brought about, can only be recovered by resetting the jaws and the limit switch dog to their respective points or starting positions.

In order to overcome this problem, a timer is normally incorporated to make sure that the clutch C is engaged only when a predetermined time has elapsed since the time when the switch controlling operation of the main shaft P is opened which results in stoppage of the main shaft P. Within this predetermined time period, the main shaft is normally braked so as to be fully stopped.

In addition, in the mechanical screw method of the prior art in FIG. 1, it is required also that the clutch C be disengaged to disconnect the feed screw S from the clutch driving motor M before the switch controlling the operation of the motor driving the main shaft P is again closed in order to preserve the correct relationship between the actual opening degree of the jaws and the position of the limits switch dog D. Therefore, it is necessary to employ another timer to insure that the switch controlling the motor driving the main shaft P is closed only after a predetermined time required for the disengagement of the clutch C as occurs subsequent to the order to restart the main shaft.

Thus, the conventional means which makes the mechanical screw method operable involves considerable time lag. In addition, a fair amount of space is required for locating the chuck driving motor. However, the mechanical screw method is a great improvement when compared with the first mentioned method, which utilizes the timer means, that method requiring the resetting of the jaws to the zero point or starting position for each operation of the chuck, and such methods cannot reliably provide accurate detection of the opening degree of the chuck jaws.

The present invention is therefore concerned with an improvement in the "mechanical screw method" of the detecting of the opening degree of chuck jaws in a machine tool or the like.

BRIEF DESCRIPTION OF THE DRAWINGS

FIG. 1 is a longitudinal section view of a conventional detecting arrangement for detecting the opening degree of chuck jaws for a machine tool.

FIG. 2 is a longitudinal sectional view of the improved arrangement for detecting the opening degree of the chuck jaws of a chuck for an automated machine tool which forms one embodiment of the present invention.

DESCRIPTION OF THE PREFERRED EMBODIMENT

Referring to FIG. 2, which shows one embodiment of the present invention, a shaft 1 is mounted for rotation by way of bearing 21 about its axis, the shaft 1 being positioned laterally of and generally parallel to the chuck driving motor 14 associated with a machine tool indicated generally at 22. The machine tool 22 is provided with a main shaft 16 and the shaft 1 commonly revolves with the main shaft 16 by way of timing belt 10, sprocket 17 fixed to one end of shaft 1, and sprocket 23 operatively coupled to the main shaft 16 in the vicinity of the reduction gear 20 and within the gear housing 9 of the machine tool. Thus, shafts 16 and 1 rotate synchronously with respect to each other. If desired, the timing belt and sprocket arrangement may be conveniently replaced by suitable direct drive gear means. Shaft 1 carries a spline 13, the shaft further carrying a bushing 2 through the splined hub 11 which is mechanically engaged with the spline 13 and thus is movable along the shaft but is non-rotatable with respect to shaft 1. An externally threaded shaft 3 is mounted by way of bearings 24 for rotation about its axis, the externally threaded shaft 3 carrying an external thread 15 and being disposed laterally of and generally parallel to shaft 1. The externally threaded shaft 3 is driven by way of a shaft 12 of chuck driving motor 14 through timing belt 10' and sprocket 19 fixed to shaft 3 and sprocket 25 fixed to the outer end of shaft 12. Shaft 3 carries a bushing 5 which has an internal thread 26 for engagement with the external thread 15 of shaft 3, the bushing 5 being operatively connected to bushing 2 through timing belt 10'' and sprockets 18 on bushing 5 and sprocket 27 on bushing 2 respectively. Suitable gear means may be substituted for the sprocket and timing belt drive between bushings 2 and 5 as well as the drive between motor drive shaft 12 and shaft 3 if desired. The bushings 2 and 5 are rotatably supported by way of roller bearing 28 within a common casing 6 such that the bushings may rotate about their axis within the casing but are prevented from longitudinal movement with respect to each other since they are encased in common casing 6.

A limit switch dog 7 is fixed to the exterior of casings 6 and a plurality of limit switches 8 which are spaced from each other and positioned in a row, have their switch actuators in the path of travel of the limit switch dog 7 which is parallel with the axis of the shaft 3.

The operation is as follows:

Assuming that the main shaft 16 is rotating, the splined shaft 1 and the externally threaded shaft 3 are rotated synchronously with each other by the main shaft 16 and by motor shaft 12, respectively. Therefore, the bushing 5, which is connected to the bushing 2 by way of timing belt 10'', rotates at the same speed with the externally threaded shaft 3 so that there occurs no axial movement of hub or bushing 5 with respect to shaft 3. Further, when shaft 16 is maintained stationary, the casing 6 and the limit switch dog 7 carried by the casing does not travel.

To the contrary, when the main shaft 16 is stopped (by means not shown) and the motor 14 is energized to drive shaft 12, the spline shaft 1 is stopped in terms of its rotation, while the externally threaded shaft 3 is being rotated by motor drive shaft 12. Therefore, the internally threaded hub 5 is forced to move in an axial direction because of the engagement of thread 14 of bushing 5 engages thread 15 of shaft 3, and the limit switch dog 7 moves to the right or the left depending upon the direction of rotation of shaft motor 14. The limit switches 8 which are connected to the control system (not shown) operate in such a manner that when depressed by dog 7 they deliver signals to the control system acting to stop the drive motor 14.

It will be understood that the travel distance of the dog 7 corresponds to the distance traveled by the chuck jaws (not shown) because the distance traveled by the chuck jaws is directly proportional to the difference of the revolution between the main shaft 16 and the motor shaft 12 which difference is also proportional to the distance traveled by dog 7. Therefore, it is possible to control the opening degree of the jaws by adjusting the position of the limit switches 8.

In the illustrated embodiment, a plurality of limit switches 8 are arranged in accordance with the number of desired openings, so that various degrees of opening of the chuck jaws are obtainable corresponding to the number of the limit switches 8 used by suitably selecting the position of the limit switch in each case in terms of the position of limit switch dog 7.

While the bushings 2 and 5 are provided with a splined coupling as at 11, and threads as at 4 at one end, on the opposite ends these members are provided with slide bearings as at 21.

As described, the arrangement of the present invention is advantageous in that the opening degree of the chuck jaws is represented by the difference in the number of revolutions between the chuck driving motor shaft 12 and the main shaft 16, so that no error is brought about even if the chuck were operating to vary its opening during the idling of the main shaft which error would necessarily occur in the conventional arrangement in which the opening degree is represented only by the revolutions of the chuck motor driving shaft.

While the invention has been particularly shown and described with reference to a preferred embodiment thereof, it will be understood by those skilled in the art that various changes in form and details may be made therein without departing from the spirit and scope of the invention.

What is claimed is:

1. A system for automatically controlling the size of the opening of the jaws of a chuck having a rotatable main shaft, a motor having a shaft connected to said main shaft for rotation therewith and connected to means associated with said main shaft for controlling the size of the opening of the jaws of the chuck, said system comprising:

a first shaft mounted for rotation about its axis and being mechanically connected to said main shaft for rotation synchronously therewith, an externally threaded, second shaft mounted for rotation about its axis and being operatively coupled with said motor shaft and being driven thereby, a casing having a limit switch dog secured thereto and rotatably supporting therein, first and second bushings, said first bushing being splined to said first shaft for rotation therewith, but movable axially thereof, said second bushing being threadably engaged with said second shaft and being movable with said casing in the axial direction of said first and second shafts, means coupling said bushings such that said bushings rotate in synchronism; and at least one limit switch for operating said motor and mounted in the path of movement of said limit switch dog to stop the motor and thereby control the size of the opening of the jaws of said chuck upon movement of said limit switch dog into contact therewith.

2. The system as claimed in claim 1, wherein; a sprocket is carried by said first shaft, a sprocket is carried by said main shaft, and a timing belt operatively couples said sprockets.

3. The system as claimed in claim 1, wherein said casing supports said first and second bushings for rotation about axes which are parallel to each other, each bushing includes a sprocket member and a timing belt, operatively couples said bushing sprockets together such that rotation of one bushing about its axis causes the other to rotate synchronously therewith.

* * * * *